United States Patent [19]

Dao

[11] 4,101,734

[45] Jul. 18, 1978

[54] BINARY TO MULTISTATE BUS DRIVER, RECEIVER AND METHOD

[75] Inventor: Tich T. Dao, Cupertino, Calif.

[73] Assignee: Signetics Corporation, Sunnyvale, Calif.

[21] Appl. No.: 741,874

[22] Filed: Nov. 15, 1976

[51] Int. Cl.$^2$ .............................................. H04B 1/00
[52] U.S. Cl. .................................... 178/68; 325/38 A; 178/70 R
[58] Field of Search ......................... 325/38 A, 41, 42; 178/68, 70 R, 70 TS; 340/347 AD, 347 DA; 328/155, 162, 163

[56] References Cited

U.S. PATENT DOCUMENTS

| | | | |
|---|---|---|---|
| 3,267,459 | 8/1966 | Chomicki et al. | 325/38 A |
| 3,731,199 | 5/1973 | Tazaki et al. | 325/38 A |
| 3,775,688 | 11/1973 | Hinoshita et al. | 325/38 A |

Primary Examiner—Thomas A. Robinson
Attorney, Agent, or Firm—Frank R. Trifari; Jack Oisher; Jerry A. Dinardo

[57] ABSTRACT

A binary to multistate line driver and remote receiver includes a line driver comprising first and second injection logic encoder circuits. The circuits have current injectors and are connected to receive respective first and second binary signals to provide analog outputs at a signal output terminal in response to the input signals. The encoder circuits each have current injectors with substantially similar structural characteristics. The line driver further includes a reference channel circuit connected to a reference terminal to provide a reference to the encoded signals. The reference circuit has a current injector with structural characteristics substantially similar to the encoder circuit current injectors. A remote receiver has reference and signal inputs connected to the corresponding driver outputs and includes a reference level circuit for generating predetermined threshold reference levels from the reference signal, an input circuit for receiving signals and generating plural replicated outputs and a threshold detector circuit having two binary outputs and further having plural input nodes connected to the threshold signal level and the replicated outputs. The inputs at the threshold detector nodes are compared and the threshold detector circuit provides a binary output from the encoded input signal which is a replica of the binary signal inputs.

9 Claims, 1 Drawing Figure

BINARY TO MULTISTATE BUS DRIVER, RECEIVER AND METHOD

CROSS REFERENCE TO RELATED APPLICATIONS

MULTIVALUED INTEGRATED INJECTION LOGIC CIRCUITRY AND METHOD, Ser. No. 718,328, filed Aug. 27, 1976, invented by Tich T. Dao, Lewis Keith Russell, and Edward J. McCluskey and assigned to a common assignee.

BACKGROUND OF THE INVENTION

The present invention relates to the field of multiplexed signal communication and more particularly to the use of threshold integrated injection circuits for accomplishing such communication.

Although multiplexing data and control signals via busses is known in the integrated circuit art, the integrated circuit package pins and the number of input/output pads on the individual chip imposes severe restraints. One current approach to overcome the limited number of pins or input/output pads is to time multiplex the pins or pads. While this approach does provide access to handle all data and control functions, a serious disadvantage is encountered in that time multiplexing doubles or otherwise greatly increases the transfer time for signals both to and from the circuitry. Thus there is a need for an improved structure and method for improving data flow to and from present integrated circuitry.

OBJECTS AND SUMMARY OF THE INVENTION

Accordingly, it is the general object of the present invention to provide a structure and corresponding method for greatly enhancing the signal data flow to and from integrated circuitry.

It is the particular object of the invention to provide a binary to multistate encoder and a compatible remote decoder or receiver providing greatly improved data flow to and from integrated circuitry.

The foregoing and other objects of the invention are achieved in a binary to multistate line driver and remote multistate to binary receiver including a line driver comprising first and second injection logic encoder circuits having current injectors. The circuits are connected to receive respective first and second binary signals for providing analog outputs at a signal output terminal in response to the input signals. The encoder circuits each have current injectors with substantially similar structural characteristics. The line driver further comprises a reference channel circuit connected to a reference terminal for providing a reference to the encoded signals. The reference circuit likewise has a current injector with structural characteristics substantially similar to those of the encoder circuit current injectors. A remote receiver has reference and signal inputs connected to the corresponding driver outputs and includes a reference level circuit for generating plural, predetermined threshold reference levels from the reference signal. The receiver further includes an input circuit for receiving the input signals and generating plural replicated outputs therefrom. A threshold detector circuit has first and second binary outputs and has plural input nodes with the predetermined threshold signal levels connected respectively thereto and one of each of the replicated outputs further connected respectively thereto. The inputs at the threshold detector nodes are compared and the threshold detector circuit provides a binary output from the encoded input signal which is a replica of the first and second binary signal inputs.

DESCRIPTION OF THE PREFERRED EMBODIMENT

Figure 1:
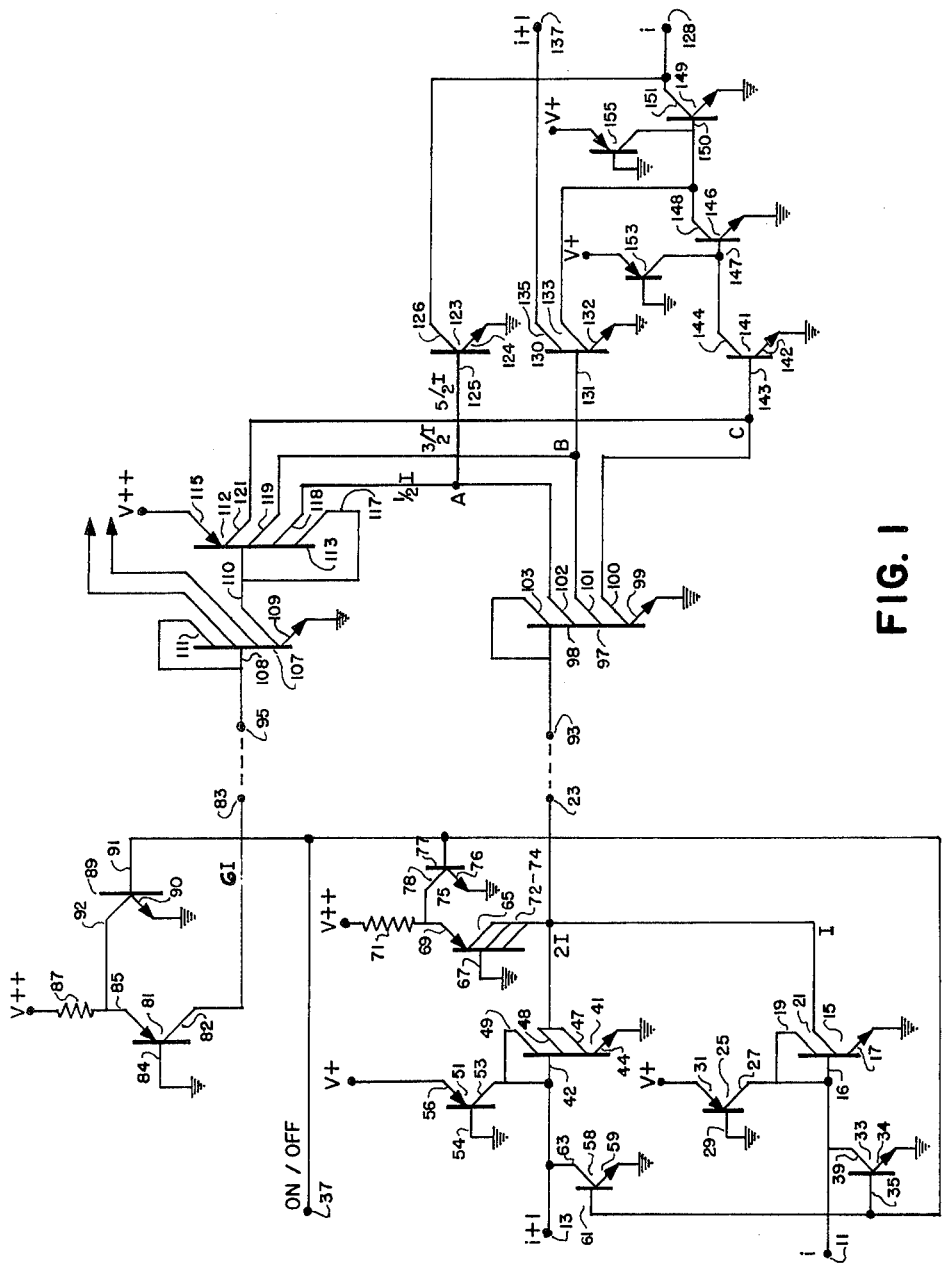
FIG. 1 is a schematic diagram showing the binary to multistate line driver and the remote multistate to binary receiver in accord with the present invention.

Referring to FIG. 1, the line driver and receiver circuits are shown. The line driver has a first binary input signal terminal 11 for receiving a binary signal i. A second input terminal 13 is provided to receive a second binary signal $i + 1$. A first two collector integrated injection logic transistor 15 is provided having a base 16 connected to input terminal 11, an emitter 17 connected to a common or ground terminal, a first collector 19 connected in a feedback current mirror connection to the base 16 and a second collector 21 connected to the analog output signal terminal 23. Transistor 15 has an associated opposite conductivity injection transistor 25 structurally positioned in injection communication with transistor 15. Transistor 25 has a collector 27 connected to base 16 of transistor 15, a base 29 connected to a common or ground terminal and an emitter 31 connected to voltage means V. A further transistor 33 having a conductivity like that of transistor 15 is associated with transistor 15 and is connected with an emitter 34 connected to a common or ground terminal, a base 35 connected to a ON/OFF terminal 37 and a collector 39 connected to the base 16 of transistor 15. As will later be seen, transistor 35 provides a further off state for all channels including the reference channel, so that for bussing purposes all channels may be activated into an off or high impedance state for connection to a common bus. In the semiconductor structure, transistor 15 collectors 19 and 21 are of substantially similar physical configuration such that for a given structure one unit of current flow can be sinked via collector 21.

A second binary input at terminal 13 is connected to transistor 41 via base electrode 42. Transistor 41 has an emitter 44 connected to a common or ground terminal and first, second, and third collector 47, 48, and 49. Each collector is capable of carrying a one unit current level. Collector 49 is connected in a feedback normalized connection to base 42 so that in operation, the feedback current may be replicated at each of collectors 47 and 48 to sink a signal to ground. In combination, collectors 47 and 48 are capable of sinking two units of current. Associated with transistor 41 is an opposite conductivity transistor 51 which is physically located in the semiconductor structure so that transistor 51 is capable of injection communication with transistor 41. Transistor 51 includes a collector 53, a base 54 connected to a common or ground terminal and an emitter 56 connected to a voltage supply V. An additional transistor 58 is provided having an emitter 59 connected to common, a base 61 connected to terminal 37 and a collector 63 connected to base 42 of transistor 41.

The line driver further includes a threshold level transistor 65 having a base 67 connected to common, an emitter 69 connected via a series dropping resistor 71 to the voltage supply means $V++$ and first, second, and third collectors 72-74 together connected to terminal 23. Series dropping resistor 71 has a value determined by the voltage supply means so that transistor 65 provides three units of current at terminal 23. An additional transistor 75 is provided having an emitter 76 connected to common, a base 77 connected to terminal 37 and a collector 78 connected to the emitter 69 of transistor 65.

The line driver further includes a reference level circuit including a transistor 81 having a collector 82 connected to a reference output terminal 83. Transistor 81 has a base 84 connected to a common or ground terminal, and an emitter 85 connected via a series dropping resistor 87 to the voltage supply means V++. Resistor 87 has a magnitude such that six units of current are provided at terminal 83 by transistor 81. An additional transistor 89 is associated with transistor 81 and has an emitter 90 connected to the common, a base 91 connected to terminal 37 and a collector 92 connected to collector 85 of transistor 81.

Signal terminal 23 and reference terminal 83 are remotely connected by lines or busses to respective terminals 93 and 95 of the remote receiver. The remote receiver includes a transistor 97 having a base 98 connected to terminal 93, an emitter 99 connected to common, and first-fourth collectors 100-103. Collector 103 is connected in a feedback normalized connection to base 98, collector 102 is connected to input node A of the threshold detector, collector 101 is connected to input node B of the detector and collector 100 is connected to input node C of the detector.

The receiver further includes a reference level circuit comprising transistors 107 and 112 for generating, in combination, plural predetermined threshold reference levels from the reference signal received at terminal 95. Transistor 107 has a base 108 connected to terminal 95, an emitter 109 connected to common, and at least first and second collectors 110 and 111. Collector 110 is connected to the base 113 of transistor 112 and collector 111 is connected in a feedback normalized connection to base 108 of transistor 107. Additional collectors may be provided as a part of transistor 107 to provide outputs for similar receivers. Transistor 112 has an emitter 115 connected to voltage supply means V++, a first collector 117 connected in a feedback connection to base 113, a second collector 118 connected to node A, a third collector 119 connected to node B, and a fourth collector 121 connected to node C. Transistors 97, 107 and 112 are isolated one from the other and are configured to provide a relatively high beta, that is, an emitter current amplification. The NPN transistor 107 is followed by PNP current mirror 112. In a physical semiconductor structure, the collector regions 118, 119, and 121 may comprise one single collector injection bar common to the input bases of the threshold detector soon to be described. The physical geometry of the transistor 112 comprises one collector 117 providing a feedback current of six units as a result of the current flowing out of terminal 83 via transistor 107. Transistor 112 collectors 118, 119 and 121 have a physical ratio to provide respective currents of 1/2 unit, 3/2 units, and 5/2 units. It is to be appreciated that the same result may be obtained by utilizing a single collector injection bar at the emitter 115, with equal spacings in N material for the input bases of the threshold detector transistor circuits and wherein the bases themselves connected to nodes A, B and C respectively may have structural dimensions differing to provide one unit, two units and three units of injection current.

The threshold detector includes a transistor 123, having an emitter 124 connected to common, a base 125 connected to node A and a collector 126 connected to an output terminal 128. An additional transistor 130 has a base 131 connected to node B, an emitter 132 connected to ground or common, a first collector 133, and a second collector 135, connected to an output terminal 137. The threshold detector further includes a transistor 141, having an emitter 142 connected to ground, a base 143 connected to node C and a collector 144 connected to a base of a following inverter transistor 146. Transistor 146 has a collector 148 connected to the base 150 of an additional inverter transistor 149. Transistor 149 has a collector 151 connected to output terminal 128. Transistors 146 and 149 have their respective emitters connected to common or ground and have associated opposite conductivity current injection transistors 153 and 155 connected between their respective bases and the voltage supply means V. The collector 148 of transistor 146 is connected to the first collector 133 of transistor 130.

Turning now to operation of the line driver and remote receiver, binary signals are first provided at input terminals 11 and 13. Transistor 65 provides three units of current, that is, 3I flowing into terminal 23. Transistors 15 and 41 can respectively sink one unit 1 and two units 2 1 of current at this node. Thus the current flowing out of the node 23 and thence to the receiver is mI where $m=0, 1, 2,$ and 3 according to the following channel input signals:

| i | i + 1 | m |
|---|---|---|
| low | low | 3 |
| high | low | 2 |
| low | high | 1 |
| high | high | 0 | thus the mI current is sent out on a single analog channel at terminal 23 and is received at terminal 93.

Before continuing with the actual detection it is important to note the simultaneous provision of a reference current 6I provided at terminal 83. It is to be appreciated that although encoding has been accomplished utilizing current sources of I, 2I, and 3I at the line driver any locally generated decoding references at the remote receiver would in all probability differ substantially in current value and provide poorer or improper operation. Thus, the reference channel provides a reference 6I current flowing out of terminal 83 and into terminal 95. The current is replicated and sinked by collector 110 of transistor 107 and further replicated at collector 117 of transistor 112. Respective collectors 118-121 then by virtue of their physical configuration provide currents in a ratio 1/2I, 3/2I, and 5/2I at nodes A, B and C respectively. Thus it is clear that the proper reference currents are provided at the input to the threshold detector. Further, any variation in the injectors 25, 51 and 65 of the line driver and of the substantially similar constructed injector 81 provides a like variation at the input of the threshold detectors at nodes A, B and C. Thus the encoding sources and the receiver decoding sources track each other despite the fact they are located on different semiconductor chips.

Returning again to the signal flow at terminal 93, the mI single channel current is received at terminal 93. By virtue of the feedback collector 103, the collectors of transistor 98 can sink mi units of current provided that the current sources at the respective nodes A-C can provide such current. Further and simultaneously, transistors 123, 130 and 141 provide threshold detection for threshold levels 1, 2 and 3. Thus:

123 is turned off, it and only if $m$ is greater than or equal to 1

130 is turned off, if and only if $m$ is greater than or equal to 2

141 is turned off, if and only if $m$ is greater than or equal to 3.

Thus, signals are provided at terminals 128 and 137 which are replicas of the respective binary signals $i$ and $i+1$. Therefore the two binary channels have encoded at the line driver, transmitted via a single analog channel with accompanying reference and subsequently decoded back into two binary channels at the remote receiver.

Thus, it is apparent that there has been provided, according to the general object of the present invention, a structure and corresponding method for greatly enhancing the signal data flow to and from integrated circuitry.

Further, according to the particular object of the invention, there has been provided a binary to multistate encoder and a compatible remote decoder or receiver providing greatly improved data flow to and from integrated circuitry.

I claim:

1. A binary to multistate line driver and remote receiver comprising,
    a line driver including
        first and second injection logic encoder circuits having current injectors connected to receive respective first and second binary input signals for providing analog outputs at a signal output terminal in response to said input signals, said first and second encoder circuits comprising first and second input devices capable of summing predetermined input levels at the output terminal together with a predetermined threshold level source connected to said output terminal, said circuits each having current injectors with substantially similar structural characteristics,
        a reference channel circuit connected to a reference terminal for providing a reference to the encoded signals, said reference circuit having a current injector with structural characteristics substantially similar to said encoder circuit current injectors,
    a remote receiver having reference and signal inputs connected to the corresponding driver outputs, including
        a reference level circuit for generating plural predetermined threshold reference levels from said reference signal,
        an input circuit for receiving said input signals and generating plural replicated outputs therefrom,
        a threshold detector circuit having two binary outputs and having plural input nodes with said predetermined threshold signal levels connected respectively thereto, and one of each replicated outputs further connected respectively thereto, so that the inputs at said nodes are compared and the threshold detector circuit provides a binary output from the encoded input signal which is a replica of the binary signal inputs.

2. The combination of a first line driver and receiver as in claim 1 and a second line driver and receiver as in claim 1 wherein the signal output terminal of the first is connected to the signal output terminal of the second.

3. A binary to multistate line driver and remote receiver comprising,
    a line driver including
        first and second injection logic encoder circuits having current injectors connected to receive respective first and second binary input signals for providing analog outputs at a signal output terminal in response to said input signals, said first and second encoder circuits comprising first and second input devices capable of sinking predetermined input levels at the output terminal together with a predetermined threshold level source connected to said output terminal, said circuits each having current injectors with substantially similar structural characteristics,
        a reference channel circuit connected to a reference terminal for providing a reference to the encoded signals, said reference circuit having a current injector with structural characteristics substantially similar to said encoder circuit current injectors,
    a remote receiver having reference and signal inputs connected to the corresponding driver outputs, including
        a reference level circuit for generating plural predetermined threshold reference levels from said reference signal,
        an input circuit for receiving said input signals and generating plural replicated outputs therefrom,
        a threshold detector circuit having two binary outputs and having plural input nodes with said predetermined threshold signal levels, connected respectively thereto, and one of each replicated outputs further connected respectively thereto, so that the inputs at said nodes are compared and the threshold detector circuit provides a binary output from the encoded input signal which is a replica of the binary signal inputs.

4. A line driver and receiver as in claim 3 wherein said first device is capable of sinking one unit of current, the second device is capable of sinking two units of current and wherein the threshold level source provides three units of current.

5. A line driver and receiver as in claim 3 wherein said reference channel comprises a current source injector providing six units of current.

6. A line driver and receiver as in claim 3 wherein said reference level circuit includes first and second current mirror feedback transistors, the first providing isolation and connected to the second for providing at separate collectors current level outputs of one, two and three units of current.

7. A line driver and receiver as in claim 3 wherein said input circuit for generating plural replicated outputs is a current mirror feedback transistor having a separate collector for each of said outputs.

8. A line driver and receiver as in claim 3 wherein said threshold detector is the combination of inverter and first, second, and third input devices the second having two collectors, one connected to an output terminal; the collector of the first device connected to an additional output terminal, the collector of the third connected to an inverter device, the second collector of the second input device connected to the collector of the inverter device, and to the input of an additional inverter device, the collector thereof connected to the additional output terminal.

9. A method for translating plural input binary signals to a single multilevel analog signal with a corresponding reference signal, and remote recovery of said signals comprising the steps of:

translating said input binary signals to predetermined threshold levels including sinking predetermined input levels together with a predetermined threshold level source at a single output terminal and simultaneously providing a reference signal, and remotely recovering said levels to binary signals by simultaneously reconstructing plural thresholds from said reference signal and comparing the received signal to said thresholds to provide replica binary outputs.

* * * * *